ALTERNATOR RECTIFIER AND VOLTAGE REGULATOR

Original Filed April 5, 1967

INVENTOR.
MICHAEL J. PITEO

BY
McDonnell, Fowler & Taylor

ATTORNEYS

United States Patent Office

Re. 27,638
Reissued May 8, 1973

27,638
ALTERNATOR RECTIFIER AND VOLTAGE REGULATOR

Michael J. Piteo, Enfield, Conn., assignor to R. E. Phelon Company, Inc., East Longmeadow, Mass.

Original No. 3,439,253, dated Apr. 15, 1969, Ser. No. 628,679, Apr. 5, 1967. Application for reissue Mar. 15, 1971, Ser. No. 124,121
Int. Cl. H02m *7/20*
U.S. Cl. 321—18 5 Claims

Matter enclosed in heavy brackets [ ] appears in the original patent but forms no part of this reissue specification; matter printed in italics indicates the additions made by reissue.

ABSTRACT OF THE DISCLOSURE

A voltage regulator-rectifier for producing a regulated voltage direct current output from an alternator includes a bridge rectifier having two arms containing diodes and two other arms containing silicon controlled rectifiers. The two silicon controlled rectifiers are switched between non-conducting and conducting states in accordance with the value of the rectifier output voltage by a gate control circuit utilizing a transformer having its secondary winding connected at its opposite ends to the gate terminals of both of the silicon controlled rectifiers so that a forward gate current applied to one silicon controlled rectifier results in a reverse gate current applied to the other. The primary winding of the transformer is connected across the rectifier input terminals and a shunt circuit controlled by the output voltage controls the conduction through the primary winding.

Background of the invention

This invention relates to devices for rectifying the output of alternators and for regulating the rectified voltage, and deals more particularly with a rectifying and regulating circuit wherein voltage regulation is obtained by open-circuiting part of the output current of the alternator.

Summary of the invention

The invention resides in a rectifying and voltage regulating circuit for use with an alternator. The rectifier part of the circuit includes at least one controlled rectifier arranged to conduct during alternate half cycles of the alternator and which must be triggered to a conducting state during each such half cycle of the alternator in order to obtain any output from the rectifier. Triggering of the controlled rectifier is achieved by a triggering circuit connected directly with the alternator and which normally functions to supply triggering energy to the controlled rectifier at the initial portion of each of said alternator half cycles. A shunt circuit is connected with the triggering circuit and is closed to shunt out the triggering circuit and thereby prevent triggering of the controlled rectifier whenever the output voltage exceeds a predetermined value.

Detailed description of preferred embodiment

Figure 1:
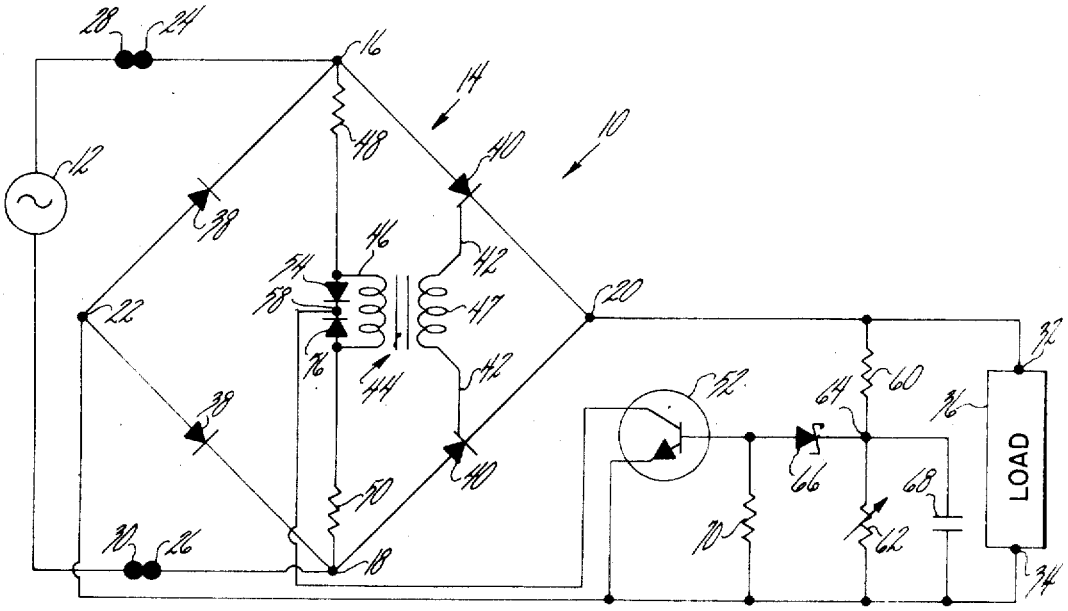
FIG. 1 is a schematic wiring diagram of a rectifier and voltage regulator embodying this invention.

Turning to the drawing, FIG. 1 shows a rectifier and voltage regulator (hereinafter referred to as a rectifier-regulator) embodying this invention and indicated generally at 10. An alternator 12 which is preferably of the permanent magnet type is connected to the rectifier-regulator 10 and supplies input voltage thereto made up essentially of a series of cycles of one polarity alternating with a series of cycles of the opposite polarity and having a generally sinusoidal wave form. The rectifier-regulator 10 includes a full wave rectifier 14 having four arms connected in a bridge network between two input junctions 16 and 18 and two output junctions 20 and 22 respectively located at diagonally opposite corners of the network. The junctions 16 and 18 may themselves comprise the inlet terminals of the rectifier-regulator but preferably and as shown the latter junctions are connected to inlet terminals 24 and 26 which are in turn connected to outlet terminals 28 and 30 of the alternator. The junctions 20 and 22 are respectively connected with outlet terminals 32 and 34 which are adapted for connection with a load such as shown at 36. Two of the arms of the bridge network each contain a diode 38 and the other two arms each contain a silicon controlled rectifier 40 having a gate terminal 42. One of the diodes 38 and an associated one of the silicon controlled rectifiers 40 are poled to conduct in a forward direction during an input half cycle of one polarity. The other diode and its associated controlled rectifier are similarly arranged to conduct in a forward direction during an input half cycle of opposite polarity.

As is well known, the voltage supplied to the gate terminal 42 of each silicon controlled rectifier 40 controls the state of conduction between its other two terminals. When the voltage between the gate terminal and the associated cathode is low the resistance between the anode and cathode is high so that little or no current flows from the anode to the cathode even when the anode and cathode are biased in a forward direction. When the gate voltage reaches a given value, however, the controlled rectifier is triggered, reducing the resistance between the anode and the cathode and causing current to flow from the anode to the cathode for so long as forward voltage is applied across the anode and cathode. That is, even after the triggering voltage is removed from the gate terminal this conduction takes place until the voltage across the anode and cathode is reversed in polarity. Thereafter the triggering voltage must again be applied to the gate terminal before the rectifier will again conduct under a forward voltage.

In the presently preferred embodiment of the invention a transformer, indicated generally at 44, is used to produce the control voltage at the gate terminal 42 of each of the controlled rectifiers. The transformer 44 has its primary winding 46 connected between and in series with resistors 48 and 50 across the bridge network between the input junctions 16 and 18. The transformer secondary winding 47 is connected across the two gate terminals 42, 42. Considering only the circuitry so far described it will be understood that the bridge network 14 in combination with the transformer 44 operates essentially similar to a conventional full wave bridge rectifier. During the initial portion of each half cycle of input current, current flows through the transformer primary 46 and induces a current in the secondary 47 which switches on the proper controlled rectifier 40, and thereafter for the remainder of the half cycle this controlled rectifier performs similarly to a conventional diode. The circuit for the current flowing in the secondary 47 passes through the gate-cathode junctions of the two controlled rectifiers and the current flowing through one of these junctions is always in the reverse direction. In this reverse direction the junction impedance is low for a brief instant after it has conducted in the forward direction and as a result the other controlled rectifier is switched on with little energy being required from the transformer. Each controlled rectifier can, in fact, be made to turn on at about the same forward voltage drop as required by diodes and hence the rectifier 14 can conduct with about the same efficiency as a conventional full wave bridge rectifier.

Voltage regulation is achieved by shunting the transformer 44 to render it incapable of producing a triggering voltage at the gate terminal 42 of each of the controlled rectifiers whenever the voltage across the output terminals 32 and 34 exceeds a predetermined value. The illustrated shunting means comprises a shunt circuit including a switching transistor 52 and two diodes 54 and 56. The latter two diodes are connected in series with one another across the transformer primary winding 46 with their cathodes connected to a common intermediate junction 58. As so arranged one diode 54 is poled to conduct in a forward direction toward the junction 58 during input half cycles of one polarity and the other diode 56 is poled to conduct in a forward direction during input half cycles of opposite plurality. The transistor 52 functions as a switch and has its emitter connected to the bridge 14 at its outlet junction 22 and its collector connected to the junction 58. By varying the base-emitter voltage of the transistor 52 it may be switched between a conducting state in which the collector-emitter resistance is low and a non-conducting state in which the collector-emitter resistance is high. Therefore, when the transistor 52 is in a conducting state the transformer primary 46 is shunted with the result that no triggering current is supplied to the controlled rectifier 40, 40 and no output is produced from the bridge network.

The switching of the transistor 52 is controlled in response to the output voltage of the bridge network 14 in such a manner as to be rendered conductive and shunt the transformer 44 whenever the output voltage exceeds a predetermined value. In the illustrated embodiment the control circuit for the transistor consists of a voltage divider including two resistors 60 and 62 connecting in series with one another across the output terminals 20 and 22 and having an intermediate terminal 64. To vary the voltage appearing at the intermediate terminal 64 for a given voltage appearing across the rectifier output terminals 20 and 22, and to thereby adjust the level of the output voltage, the resistor 62 is adjustable. Between the intermediate terminal 64 and the base of the transistor 52 is a Zener diode 66 having its cathode connected to the intermediate terminal and its anode connected to the transistor base. The Zener diode 66 prevents application of a forward voltage to the base of the transistor 52 until its breakdown voltage is reached. A capacitor 68 connected in parallel with the adjustable resistor 62 provides a more steady voltage at the Zener diode 66 and thereby causes the Zener diode to switch sharply from its non-conducting to its conducting state when the Zener breakdown voltage is achieved. A resistor 70 is connected between the base of the transistor and the negative output terminal 34 to maintain the base at the potential of the terminal 34 and the transistor therefore biased to a non-conducting state when the Zener diode is non-conducting.

Figure 2:
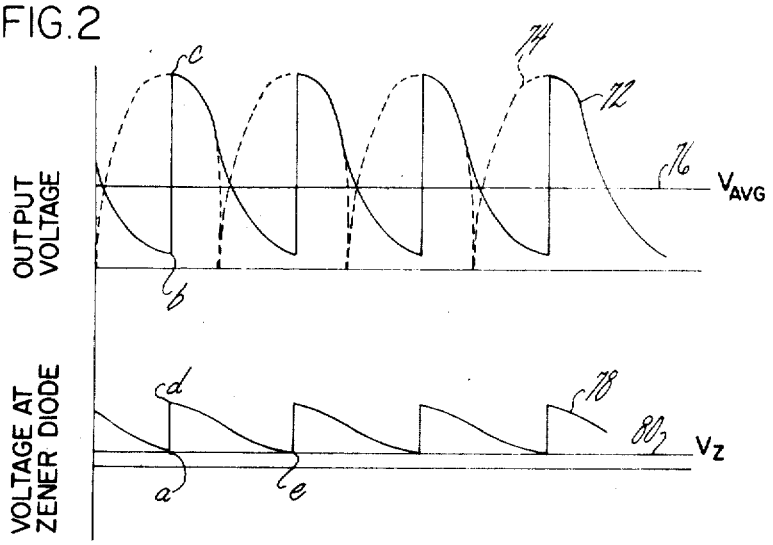
FIG. 2 is a graph showing the output voltage wave form of the FIG. 1 rectifier and voltage regulator.

The operation of the control circuit may perhaps be best understood by reference to FIG. 2 which shows the wave forms appearing at different points in the control circuit. Referring to this figure the upper wave form 72 represents the output voltage from the rectifier 14 as measured across the load terminals 32 and 34. The broken line 74 indicates the wave form which would be obtained in the absence of the control circuit, this wave form being merely a conventional full wave rectifier output consisting of a series of half cycle waves of sinusoidal form. The horizontal line 76 represents the desired average output voltage. The line 78 represents the voltage across the Zener diode 66 and the horizontal line 80 represents its breakdown voltage.

Considering the first half cycle of FIG. 2, at the beginning of this cycle the voltage across the Zener diode 66, as represented by the line 78, is greater than its breakdown voltage. This is due to the charge on the capacitor 68 which slowly leaks off through the resistor 62 and through the resistor 60 and load 36. As a result of this discharge of the capacitor 68 the voltage across the Zener diode decreases until reaching the breakdown voltage, as indicated at the point a. Before reaching the point a the Zener diode is therefore in a conducting state which turns on the transistor 52 and shunts the primary winding 46 of the transformer 44 so that no output voltage is obtained from the rectifier 14. When the point A is reached, however, the Zener diode 66 stops conducting momentarily and turns off the transistor 52. This in turn removes the shunt from the transformer and causes a triggering voltage to be applied to the gate terminal 42 of one or the other of the two silicon controlled rectifiers 40, 40, depending on the polarity of the output from the alternator 12. The rectifier 14 therefore starts to conduct at this time and the output voltage of the rectifier, as represented by the line 72, rises relatively suddenly from the point b to the point c. This rising of the output voltage also causes the voltage at the Zener diode to rise from the point a to the point d and the Zener diode thereupon again breaks down and conducts to turn on the transistor 52 and to again shunt the primary coil 46 of the transformer 44. This removes the triggering voltage from the gate terminal of the active silicon controlled rectifier but the controlled rectifier nevertheless continues to conduct for the remainder of the half cycle. At the end of the half cycle no triggering voltage is applied to either of the silicon controlled rectifiers and the previously active rectifier is turned off by the reversal of the polarity. As a result both the output voltage and the voltage at the Zener diode continue to decay, as a result of the discharging of the capacitor 68, until the voltage at the Zener diode reaches the point e at which the Zener diode is again momentarily rendered non-conducting and the previously described process repeats itself.

It should be evident from FIG. 2 that as the load 36 becomes smaller the portions of each half cycle during which conduction takes place become smaller and smaller to maintain the average output voltage at a constant level. It should also be noted that the conduction which does take place takes place during the trailing portion of each half cycle. As the load 36 becomes higher and higher the point at which conduction starts moves more and more toward the beginning point of each half cycle.

I claim:

[1. A voltage regulator-rectifier for use with an alternator having two output terminals and producing an alternating output voltage at said terminals the wave form of which is made up essentially of a series of half cycles of one polarity alternating with a series of half cycles of the opposite polarity, said regulator-rectifier comprising a rectifier having two input terminals adapted for connection to said output terminals of said alternator and also having two output terminals of its own, said rectifier including for arms connected in bridge fashion between said two input terminals thereof and said two output terminals thereof, two of said arms each containing diodes and the other two of said arms each containing a controlled rectifier having a gate terminal, said diodes and controlled rectifiers being so arranged that one diode and one controlled rectifier are poled to conduct in the forward direction during said half cycles of one polarity and so that the other diode and the other controlled rectifier are poled to conduct in a forward direction during said half cycles of the opposite polarity, a transformer having a primary winding and an untapped secondary winding, means producing an alternating current signal passing through said primary winding of said transformer the direction of which is directly related to the polarity of the alternating voltage applied across said input terminals, said secondary winding having one end thereof connected to the gate terminal of one of said controlled rectifiers and its other end connected to the gate terminal of the other of said controlled rectifiers so that during said half cycles of one polarity a gate current is induced in said secondary winding which passes through the gate terminals of both of said controlled rectifiers in the forward direction with respect to one of said controlled rectifiers and in the reverse direction with respect to the other of said controlled rectifiers and so that during said half cycles of opposite polarity an oppositely directed gate current is induced in said secondary winding which is in the reverse direction with respect to said one controlled rectifier and in the forward direction with respect to said other controlled rectifier, and means for eliminating said alternating current signal in said primary winding to prevent triggering of said controlled rectifiers whenever the voltage across said two rectifier output terminals exceeds a predetermined value.]

[2. A voltage regulator-rectifier as defined in claim 1 further characterized by said means for producing an alternating current signal through said primary winding comprising means connecting said primary winding across said input terminals so that said alternating current signal is derived directly from said alternator.]

[3. A voltage regulator-rectifier as defined in claim 1 further characterized by said means for eliminating said alternating current signal from said primary winding comprising means for shunting said primary winding when the voltage across said two rectifier output terminals exceeds a predetermined value.]

[4. A voltage regulator-rectifier as defined in claim 1 further characterized by said means for eliminating said alternating current signal through said secondary winding comprising said two shunt diodes connected across said secondary winding with each having a like terminal connected to an intermediate junction so that one of said shunt diodes is poled to conduct in a forward direction during said half cycles of one polarity and the other shunt diodes is poled to conduct in a forward direction during said half cycles of opposite polarity, a line connecting said intermediate junction to one terminal of said rectifier, a switching transistor in said line, and means for biasing said switching transistor between conducting and non-conducting states in response to the voltage across said two output terminals of said rectifier.]

[5. A voltage regulator-rectifier as defined in claim 4 further characterized by said means for biasing said switching transistor between conducting and non-conducting states comprising two resistors connected in series between said output terminals, a capacitor connected in parallel with one of said resistors, a Zener diode connected between the base of said switching transistor and the junction between said two resistors, and a resistor connected between the base of said transistor and one of said output terminals.]

[6. A voltage regulator-rectifier for use with an alternator, said regulator-rectifier comprising a bridge rectifier having two input terminals and two output terminals and four arms connected in bridge fashion between said input and output terminals, the two of said arms which are connected between said two input terminals and a common one of said output terminals each containing a controlled rectifier poled to conduct in a common direction with regard to said common output terminal and having a gate terminal, a transformer having a primary winding connected with said input terminals so as to have an alternating current signal passing therethrough the direction of which is directly related to the polarity of the voltage signal applied across said input terminals, said transformer also having an untapped secondary winding having one end connected to the gate terminal of one of said controlled rectifiers and its other end connected to the gate terminal of the other of said controlled rectifiers so that the current induced therein is constrained to pass through the gate terminal of one of said rectifiers in the forward direction and through the gate terminal of the other of said controlled rectifiers in the reverse direction, and means for shunting said primary winding to eliminate said current signal therein when the voltage across said two rectifier output terminals exceeds a predetermined value.]

[7. A voltage regulator-rectifier for use with an alternator, said regulator rectifier comprising a bridge rectifier having two input terminals and two output terminals and four arms connected in bridge fashion between said input and output terminals, the two of said arms which are connected between said two input terminals and a common one of said output terminals each containing a controlled rectifier poled to conduct in a common direction with regard to said common output terminal and having a gate terminal, a transformer having a primary winding connected with said input terminals so as to have an alternating current signal passing therethrough the direction of which is directly related to the polarity of the voltage signal applied across said input terminals, said transformer also having an untapped secondary winding having one end connected to the gate terminal of one of said controlled rectifiers and its other end connected to the gate terminal of the other of said controlled rectifiers so that the current induced therein is constrained to pass through the gate terminal of one of said rectifiers in the forward direction and through the gate terminal of the other of said controlled rectifiers in the reverse direction, two diodes connected in series with one another across said primary winding with each having a like terminal connected to an intermediate junction, a line connecting said intermediate junction to one output terminal of said rectifier, a switching transistor in said line, and means for biasing said switching transistor between conducting and non-conducting states in response to the voltage across said two output terminals of said rectifier.]

*8. The combination with a load and with an alternator which produces an alternating output voltage the waveform of which is made up essentially of a series of half cycles of one polarity alternating with a series of half cycles of the opposite polarity of a voltage regulator-rectifier, said voltage regulator-rectifier comprising: a rectifier means connected in circuit with said load and with said alternator for permitting current from said alternator to flow through said load only in one direction, said rectifier means including a controlled rectifier having a gate terminal, a cathode terminal and an anode terminal and which controlled rectifier is arranged to be biased in the forward conducting direction between said anode and cathode during said half cycles of one polarity; a triggering means for producing triggering signals applied to said gate terminal of said controlled rectifier which triggering means includes a first circuit including a trigger signal producing component, said first circuit being connected across said rectifying means in parallel with the alternating voltage applied across said rectifying means by said alternator so that only when a voltage of said one polarity appears across said rectifying means will current flow through said trigger signal producing component in one given direction, said component being operable in response to the initiation of current flow therethrough in said one given direction to produce a triggering signal for triggering said controlled rectifier to its conducting state; and regulator means responsive to the voltage appearing across said load for preventing current flow through said component when said voltage across said load exceeds a predetermined value and for permitting current flow through said component when said voltage across said load is less than said predetermined value.*

*9. The combination defined in claim 8 further characterized by said trigger signal producing component being a transformer having a primary winding and a secondary winding, and wherein said first circuit which is connected across said rectifying means includes said primary winding of said transformer, said secondary winding of said transformer being connected between said gate terminal and said cathode terminal of said controlled rectifier.*

*10. The combination defined in claim 8 further characterized by said rectifying means including two controlled rectifiers, said trigger signal producing component having current flowing therethrough in the direction opposite to said one given direction when a voltage of said opposite polarity appears across said rectifying means, said component being operable in response to the flow of current therethrough in said opposite direction to produce a triggering signal for triggering the other one of said two controlled rectifiers to its conducting state.*

*11. The combination with a load and with an alternator which produces an alternating output voltage the waveform of which is made up essentially of a series of half cycles of one polarity alternating with a series of half cycles of the opposite polarity of a voltage regulator-rectifier, said voltage regulator-rectifier comprising: a rectifying means connected with said load and with said alternator for permitting current from said alternator to flow in only one direction through said load, said rectifying means including a controlled rectifier having a gate terminal, a cathode terminal and an anode terminal and which controlled rectifier is arranged to be biased in its forward conducting direction between said anode and cathode terminals during said half cycles of one polarity; a transformer having a primary winding and a secondary winding; a first circuit connected across said rectifying means in parallel with the alternating voltage applied across said rectifying means by said alternator, said first circuit including said primary winding of said transformer so that when a voltage of said one polarity appears across said rectifying means current flows through said primary winding and induces a voltage signal in said secondary winding; means connecting said secondary winding with said gate terminal of said controlled rectifier so that*

*when a voltage of sufficient value is induced in said secondary winding said controlled rectifier is triggered to its conducting state; and regulator means responsive to the voltage appearing across said load for preventing current flow through said primary winding when said voltage across said load exceeds a predetermined value and for permitting current flow through said primary winding when said voltage across said load is less than said predetermined value.*

*12. The combination defined in claim 11 further characterized by said regulator means being a shunt circuit connected in parallel with said primary winding of said transformer, and means for closing said shunt circuit when said voltage across said load exceeds said predetermined value and for opening said shunt circuit when said voltage across said load is less than said predetermined value.*

References Cited

The following references, cited by the Examiner, are of record in the patented file of this patent or the original patent.

UNITED STATES PATENTS

| | | | |
|---|---|---|---|
| 3,300,704 | 1/1967 | McMillen | 323—22 SC X |
| 3,427,528 | 2/1969 | Custer | 322—28 X |
| 3,009,091 | 11/1961 | Hallidy | 322—28 |
| 3,230,443 | 1/1966 | Hallidy | 323—22 SC X |
| 3,315,141 | 4/1967 | Wright et al. | 320—59 |
| 3,341,763 | 9/1967 | Noddin | 320—39 |

WILLIAM M. SHOOP, Jr., Primary Examiner

U.S. Cl. X.R.

321—47; 323—22 SC; 322—28